(12) United States Patent  
George et al.

(10) Patent No.: US 10,443,790 B2  
(45) Date of Patent: *Oct. 15, 2019

(54) OPTICAL LIGHT PIPE WITH UNIFORM LIT INTENSITY

(71) Applicant: Flex-N-Gate Advanced Product Development, LLC, Tecumseh (CA)

(72) Inventors: Ronie George, Kentwood, MI (US); James R. Rhodes, Belmont, MI (US)

(73) Assignee: Flex-N-Gate Advanced Product Development, LLC, Tecumseh (CA)

(*) Notice: Subject to any disclaimer, the term of this patent is extended or adjusted under 35 U.S.C. 154(b) by 190 days.

This patent is subject to a terminal disclaimer.

(21) Appl. No.: 15/621,478

(22) Filed: Jun. 13, 2017

(65) Prior Publication Data

US 2017/0343166 A1 Nov. 30, 2017

Related U.S. Application Data

(63) Continuation of application No. 13/840,425, filed on Mar. 15, 2013, now Pat. No. 9,677,721.

(Continued)

(51) Int. Cl.
*F21K 9/61* (2016.01)
*F21V 8/00* (2006.01)

(Continued)

(52) U.S. Cl.
CPC ............... *F21K 9/61* (2016.08); *F21S 43/14* (2018.01); *F21S 43/237* (2018.01); *F21S 43/245* (2018.01); *F21S 43/247* (2018.01); *F21S 43/249* (2018.01); *F21S 43/40* (2018.01); *G02B 6/001* (2013.01); *G02B 6/0061* (2013.01); *G02B 6/0046* (2013.01); *G02B 6/0055* (2013.01)

(58) Field of Classification Search
CPC ......... F21K 9/61; F21S 43/247; F21S 43/237; F21S 43/249; F21S 43/14; F21S 43/40; F21S 43/245; G02B 6/0061; G02B 6/001; G02B 6/0046; G02B 6/0055

See application file for complete search history.

(56) References Cited

U.S. PATENT DOCUMENTS 2,173,371 A 5/1939 Penoyer
3,497,981 A 3/1970 Tyne
(Continued)

*Primary Examiner* — David V Bruce
(74) *Attorney, Agent, or Firm* — Reichel Stohry Dean LLP; Mark C. Reichel; Natalie J. Dean

(57) ABSTRACT

The present application discloses a light pipe assembly having a light pipe with a proximal end, an opposing distal end, a length between the proximal end and the distal end, and a surface, the surface having an emitting portion and an overlay portion, where the light pipe is a material capable of transmitting light with a first refractive index; and a reflective secondary surface having a second refractive index and a width, the reflective secondary surface positioned adjacent the overlay portion of the light pipe, where the first refractive index is greater than the refractive index of air, and the second refractive index is greater than the first refractive index. In at least one embodiment, the reflective secondary surface is a non-metallic material capable of reflecting light. In at least one embodiment, the width of the reflective secondary surface varies along the length of the light pipe.

19 Claims, 9 Drawing Sheets

Related U.S. Application Data

(60) Provisional application No. 61/745,298, filed on Dec. 21, 2012.

(51) Int. Cl.
    *F21S 43/14*     (2018.01)
    *F21S 43/237*    (2018.01)
    *F21S 43/245*    (2018.01)
    *F21S 43/249*    (2018.01)
    *F21S 43/247*    (2018.01)
    *F21S 43/40*     (2018.01)

(56) References Cited

U.S. PATENT DOCUMENTS

| | | |
|---|---|---|
| 5,596,671 A | 1/1997 | Rockwell, III |
| 5,903,695 A | 5/1999 | Zarian et al. |
| 6,095,673 A * | 8/2000 | Goto .................. B29C 47/0019 362/307 |
| 6,123,442 A | 9/2000 | Freier |
| 6,597,834 B1 * | 7/2003 | Hata ...................... G02B 6/001 385/31 |
| 6,769,799 B2 | 8/2004 | Goto et al. |
| 6,863,428 B2 | 3/2005 | Lundin |
| 7,374,313 B2 | 5/2008 | Cassarly et al. |
| 7,389,020 B2 | 6/2008 | Dixon |
| 7,549,763 B2 | 6/2009 | Cassarly et al. |
| 2009/0257242 A1 | 10/2009 | Wendman |
| 2010/0091293 A1 | 4/2010 | Shani |
| 2012/0092750 A1 | 4/2012 | Kroll et al. |

* cited by examiner

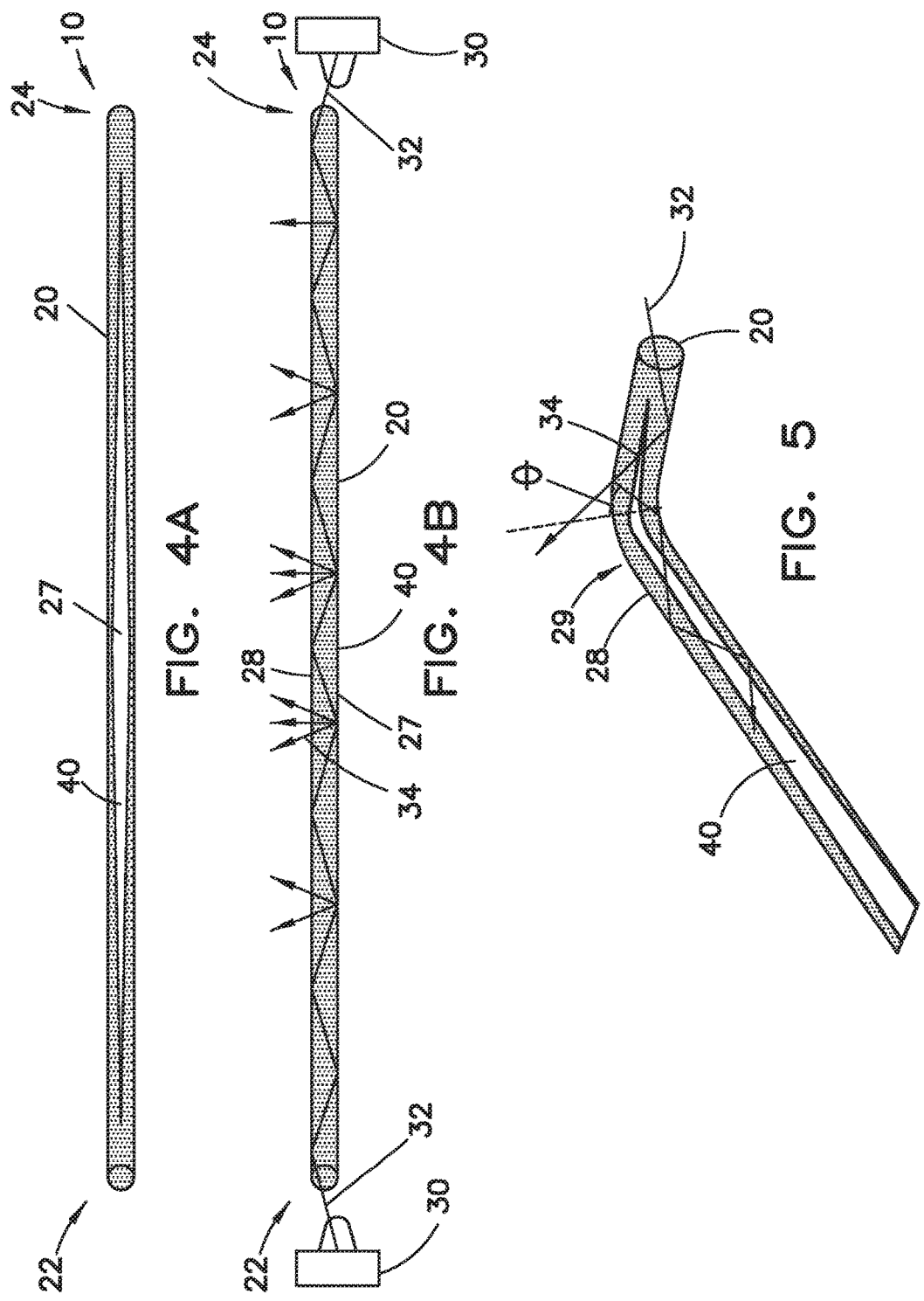

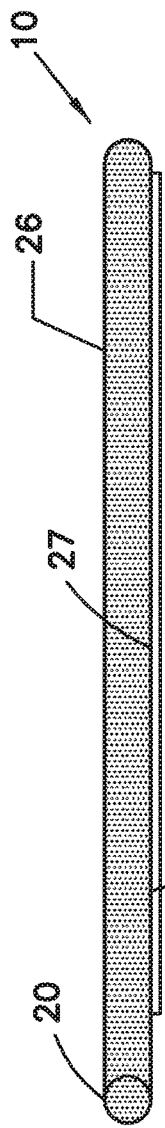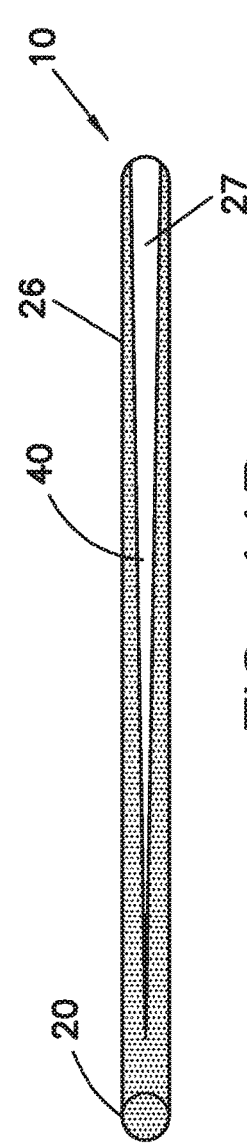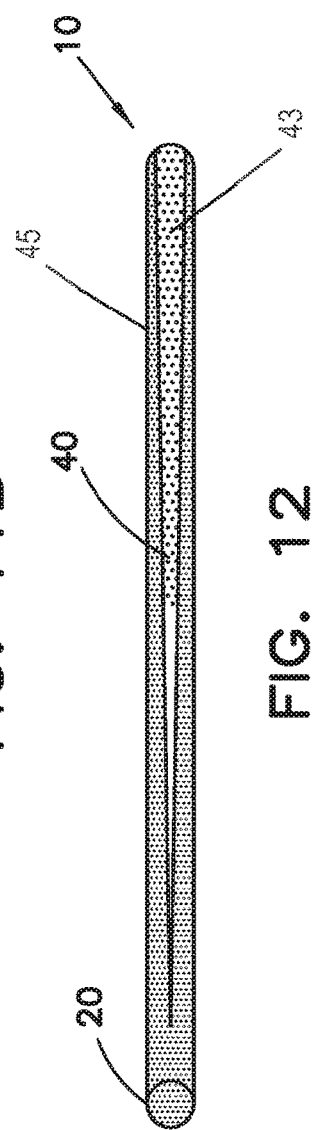

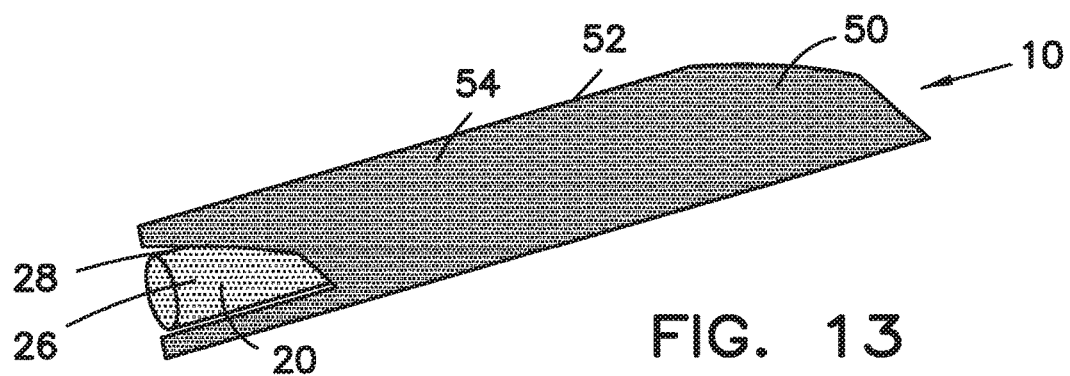

OPTICAL LIGHT PIPE WITH UNIFORM LIT INTENSITY

PRIORITY

This application is related to, and claims the priority benefit of, and is a U.S. continuation application of, U.S. Nonprovisional patent application Ser. No. 13/840,425, filed Mar. 15, 2013 and issued as U.S. Pat. No. 9,677,721 on Jun. 13, 2017, which is related to, and claims the priority benefit of U.S. Provisional Patent Application Ser. No. 61/745,298, filed Dec. 21, 2012. The contents of each of the foregoing patent applications are hereby incorporated by reference in their entirety into this disclosure.

BACKGROUND

The design of the exterior lighting components of automobiles plays an important role in the styling and marketing of vehicles in the automotive market. Vehicle designers are interested in technologies that can both provide the required regulatory functions of automotive exterior lighting and enable a unique and aesthetically pleasing lit and unlit appearance of the lighting components on the vehicle. There is also a desire to create uniformity and continuity in the lit appearance of functionally separate lamps that may be in close proximity to one another, for instance, the corner tail lamp and the applique or lift gate lamps. Achieving the desired uniformity generally requires the use of the same light source in different lamps with different functions. Accordingly, potential light sources must be capable of providing a range of different automotive lighting functions.

In addition to the use of conventional incandescent bulbs in exterior lighting, automotive engineers have more recently incorporated light emitting diodes into lighting as a light source. Because light emitting diodes are a point source generally providing light in a Lambertian distribution, the use of light emitting diodes yields a lit appearance that is "spotty" or "dotted," which is currently common on many automobiles. However, more recently vehicle designers have demanded greater homogeneity in the lit appearance of the lamps. Consequently, a uniformly lit "neon-look," similar to the appearance of a neon tube, is in relatively high demand. However, neon tubes have not been widely adopted in automotive lighting due to a number of technical drawbacks.

Recently, light guides have been used in lamps to approximate the look of a neon tube. However, conventional light guides or pipes have difficulty creating a uniformly lit appearance because the emission of light near the light source is generally significantly greater than the light emission further along the length of the guide. The result is line or bar of light that is noticeably brighter at an end than in the middle.

Therefore, there is a need for an optical-grade light pipe that may be lit with a single, localized source that provides a uniform light intensity along its entire length and that enables a lamp meeting the functional requirements for an automotive lamp.

BRIEF SUMMARY

According to one aspect of the present disclosure a light pipe assembly is disclosed. In at least one embodiment, a light pipe assembly includes a light pipe having a proximal end, an opposing distal end, a length between the proximal end and the distal end, and a surface, the surface having an emitting portion and an overlay portion, where the light pipe is a material capable of transmitting light with a first refractive index; and a reflective secondary surface has a second refractive index and a width, the reflective secondary surface disposed adjacent the overlay portion of the light pipe, where the first refractive index is greater than the refractive index of air, and the second refractive index is greater than the first refractive index. In at least one embodiment, the reflective secondary surface is a non-metallic material capable of reflecting light.

In at least one embodiment, the reflective secondary surface is disposed adjacent the overlay portion of the light pipe such that a gap is formed between the reflective secondary surface and the light pipe, the gap selected such that the reflective secondary surface is capable of propagating an evanescent wave at a point where any of a plurality of light rays traveling through the light pipe are internally reflected at a boundary between the overlay portion and reflective secondary surface. In at least one embodiment, the gap is variable along the length of the light pipe.

In at least one embodiment, the width of the reflective secondary surface varies along the length of the light pipe. In at least one embodiment, the width of the reflective secondary surface is wider at or near the distal end than at or near the proximal end of the light pipe. In at least one embodiment, the width of the reflective secondary surface is narrower at or near the proximal end and at or near the distal end of the light pipe than along the length therebetween. In at least one embodiment, the light pipe includes a bend, and wherein the reflective secondary surface is narrower at or near the bend than at a location adjacent thereto.

In at least one embodiment, the light pipe assembly further includes at least one light source disposed adjacent the proximal end of the light pipe, the at least one light source capable of generating a plurality of light rays, wherein the plurality of light rays are generally directed into the light pipe in the direction of the distal end. In at least one embodiment, the light pipe assembly further includes at least one light source disposed adjacent the distal end of the light pipe, the at least one light source capable of generating a plurality of light rays, wherein the plurality of light rays are generally directed into the light pipe in the direction of the proximal end. In at least one embodiment, the at least one light source is a light emitting diode.

In at least one embodiment, the light pipe assembly further includes coupling optics disposed between the at least one light source and the light pipe. In at least one embodiment, the overlay portion of the light pipe has a cross-sectional area having a first shape and the emitting portion of the light pipe has a cross-sectional area having a different, second shape.

According to one aspect of the present disclosure, a lamp assembly is disclosed. In at least one embodiment, the lamp assembly includes a light pipe having a proximal end, an opposing distal end, a length between the proximal end and the distal end, and a surface, the surface having an emitting portion and an overlay portion, where the light pipe is comprised of a material capable of transmitting light with a first refractive index; and at least one light source disposed adjacent the proximal end of the light pipe and capable of generating a plurality of light rays, wherein the plurality of light rays are generally directed into the light pipe in the direction of the distal end. The lamp assembly further includes a reflective secondary surface having a second refractive index and a width, the reflective secondary surface disposed adjacent the overlay portion of the light pipe such that the reflective secondary surface is capable of propagating an evanescent wave at a point where any of the plurality of light rays traveling through the light pipe is internally reflected at a boundary between the overlay portion and reflective secondary surface, where the first refractive index is greater than the refractive index of air, and the second refractive index is greater than the first refractive index. The lamp assembly further includes a housing and a lens, where the lens is disposed adjacent the housing such that the lens and housing substantially surround the at least one light source, the light pipe, and the reflective secondary surface.

BRIEF DESCRIPTION OF THE DRAWINGS

FIG. 4A shows a rear view of an embodiment of an exemplary optical light pipe assembly according to the present disclosure;

FIG. 4B shows a side view of an embodiment of an exemplary optical light pipe assembly according to the present disclosure;

FIG. 5 shows a rear view of an embodiment of an exemplary optical light pipe assembly according to the present disclosure;

FIG. 11A shows a side view of an embodiment of an exemplary optical light pipe assembly according to the present disclosure;

FIG. 11B shows a rear view of an embodiment of an exemplary optical light pipe assembly according to the present disclosure;

FIG. 12 shows a rear view of an embodiment of an exemplary optical light pipe assembly according to the present disclosure;

FIG. 13 shows a partially cutaway perspective view of an embodiment of an exemplary optical light pipe assembly according to the present disclosure;

DETAILED DESCRIPTION

Figure 1A:
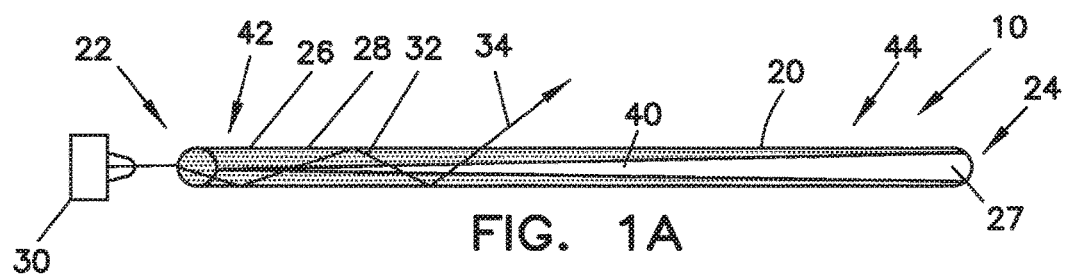
FIG. 1A shows a rear view of an embodiment of an exemplary optical light pipe assembly according to the present disclosure.

The present application discloses various embodiments of an optical-grade light pipe and methods for using and constructing the same. According to one aspect of the present disclosure, a solid optical-grade light pipe with a custom secondary reflective layer that enables a uniform emitted light intensity along its length that may be lit with a single localized source is disclosed. For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

For the purposes of this disclosure, the terms light guide and light pipe are equivalent. The efficiency of a light guide may be quantified as the total amount of light emitted from an emitting surface of the guide compared to the total light emitted by a light source coupled to the guide.

FIG. 1A shows an optical light pipe assembly 10 according to at least one embodiment of the present disclosure. As shown in FIG. 1A, the light pipe assembly 10 may include a light pipe 20, having a proximal end 22, a distal end 24, and a surface 26, and a reflective secondary surface 40 disposed adjacent the surface 26. The surface 26 may include an emitting portion 28 and an overlay portion 27, where the reflective secondary surface 40 may be disposed adjacent the overlay portion 27 of the surface 26. The light pipe assembly 10 may further include at least one light source 30 optically coupled to the light pipe 20 at or near the proximal end 22 such that a plurality of light rays 32 may be transmitted into the light pipe 20 in the general direction of the distal end 24.

Figure 1B:
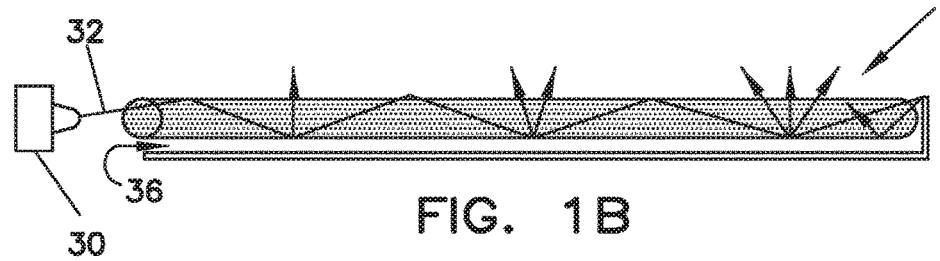
FIG. 1B shows a side view of an embodiment of an exemplary optical light pipe assembly according to the present disclosure.

As shown in FIG. 1A, the reflective secondary surface 40 may not be coextensive with the surface 26. Specifically, the area of the reflective secondary surface 40 may vary from a proximal end 42 near the light source 30 to a distal end 44 further from the light source 30, generally corresponding to the proximal end 22 and the distal end 24 of the light pipe 20, respectively. More specifically, the width of the reflective secondary surface 40 may vary along the light pipe 20 from the proximal end 22 toward the distal end 24, such that the reflective secondary surface 40 may be wider at or near the distal end 44 further from the light source 30 and taper or become narrower at or near the proximal end 42 near the light source 30. Further, the reflective secondary surface 40 may be disposed adjacent the surface 26 such that a gap 36 is maintained therebetween as shown in FIG. 1B. The magnitude of the gap 36 as depicted in FIG. 1B relative to the size of the reflective secondary surface 40 and the light pipe 20 has been exaggerated for clarity. The reflective secondary surface 40 may further extend to and be disposed adjacent the distal end 24 of the light pipe 20. In such an embodiment, any of the plurality of light rays 32 incident upon the distal end 24 may be reflected in the general direction of the proximal end 22 and, thus, contribute to the emitted light distribution of the light pipe assembly 10.

Figure 14A:
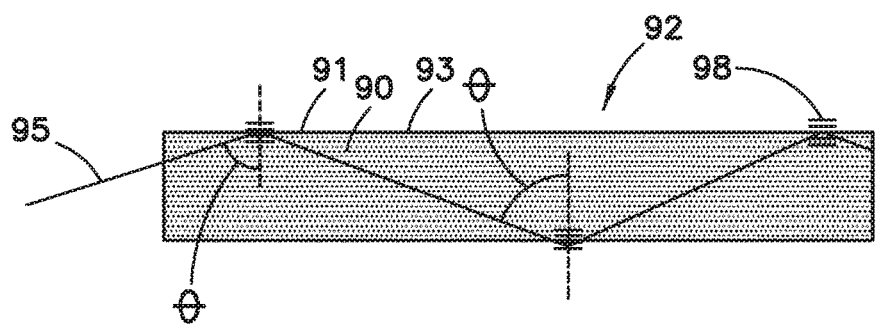
FIG. 14A illustrates total internal reflection of a light ray within a material according to the prior art.

In operation, the light pipe assembly 10 may produce a desired emitted light distribution of substantially uniform intensity using total internal reflection and evanescent coupling. FIG. 14A illustrates the principle of total internal reflection according to the prior art. Total internal reflection is a phenomenon of light when it intersects a boundary between different media. As shown in FIG. 14A, an individual light ray 95 propagating through a first medium 90, having a refractive index $n_1$, may fall incident upon a surface 93 at an angle of incidence $\theta_i$, where the surface 93 forms a boundary 91 with a second medium 92, having a refractive index $n_2$. The angle of incidence $\theta_i$ may be defined in relation to the normal of the surface 93 at the point where the light ray 95 is incident upon the surface 93.

Figure 14B:
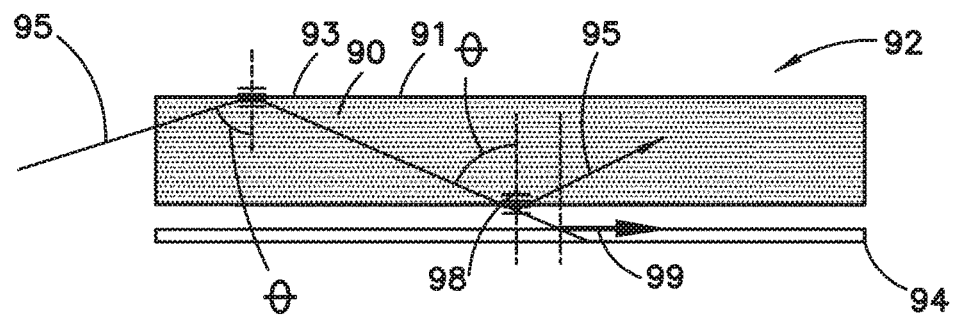
FIG. 14B illustrates evanescent coupling of a light ray at a media boundary according to the prior art.

The light ray 95 incident upon the surface 93 at an angle of incidence $\theta_i$ will be partially refracted at the boundary 91 and partially reflected within the first medium 90. Where reflected, the light ray 95 may reflect off the boundary 91 and remain in the first medium 90. Where refracted, as shown in FIG. 14B, the light ray 95 may pass through the surface 93 and emit from the first medium 90. Whether the light ray 95 is reflected or refracted depends upon the angle of incidence $\theta_i$, the refraction index n1 of the first medium 90, and the refraction index $n_2$ of the second media 92 as defined by Snell's Law:

$$n_1(\sin \theta_i) = n_2(\sin \theta_2),$$

where $\theta_2$ is the angle of the light ray after intersecting the boundary 91 relative to the normal of the surface intersected.

According to Snell's Law, where the $n_1$ is greater than $n_2$ (that is, where the first medium 90 has a higher refractive index than the second medium 92), there exists a critical angle $\theta_c$ at which all light rays 95 having an angle of incidence $\theta_i$ greater than the critical angle $\theta_c$ will be entirely reflected within the first medium 90. The critical angle is given by:

$$\theta_c = \arcsin(n_2/n_1)$$

The reflection of all light rays 95 with an angle of incidence $\theta_i$ at the boundary greater than the critical angle $\theta_c$ is known as total internal reflection. Where the fraction $n_2/n_1$ is greater than 1, the arcsine is not defined, meaning that total internal reflection does not occur. Accordingly, the critical angle $\theta_c$ is only defined for $n_2/n_1$ less than 1, meaning the refractive index $n_1$ of the first medium 90 must be greater than the refractive index $n_2$ of the second medium 92 to achieve total internal reflection.

At every point along the boundary 91 where total internal reflection occurs, a standing electromagnetic field called an evanescent wave 98 is created because the electric and magnetic fields associated with the light ray 95 cannot be discontinuous at the boundary 91. Essentially, though total internal reflection occurs, an aspect of the incident light ray 95 is transmitted through the boundary 91 as a non-traveling or "standing" wave, the only solutions of which in a dielectric material are those that decay exponentially. The resulting standing wave is known as an evanescent wave.

As shown in FIG. 14B, the evanescent wave 98 may be made to propagate as propagating ray 99 through a third medium 94 via evanescent coupling, where a refractive index $n_3$ of the third medium 94 is greater than the refractive index $n_1$ of the first medium 90, and where the third medium 94 is positioned in close proximity to the first medium 90 at a point where total internal reflection of the light ray 95 occurs. The phenomenon of light in which the evanescent wave is made to propagate through the third medium 94 is referred to as evanescent coupling.

Figure 2:
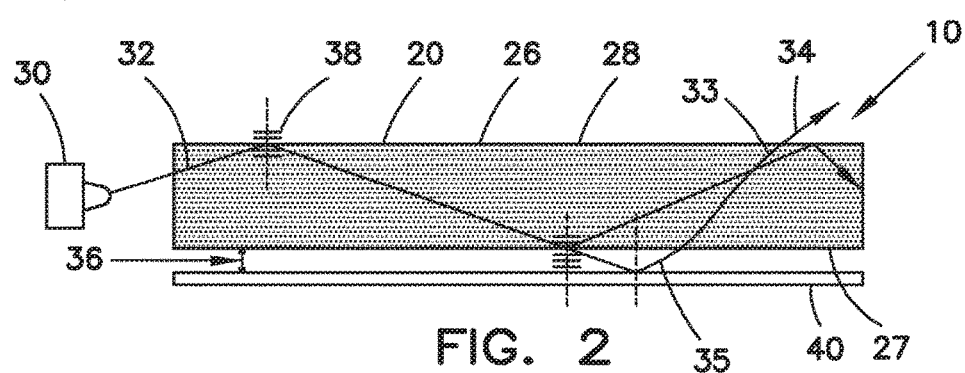
FIG. 2 shows a side view of an embodiment of an exemplary optical light pipe assembly according to the present disclosure.

In at least one embodiment according to the present disclosure, the light pipe assembly 10 is engineered to use the principles of total internal reflection and evanescent coupling of the light rays 32 from the light source 30 traveling through the light pipe 20 to generate an emitted light distribution that is of greater intensity and uniformity than a conventional light guide. As shown in FIG. 2, in at least one embodiment according to the present disclosure, the reflective secondary surface 40 may be positioned adjacent the overlay portion 27 of the surface 26 to form the gap 36 therebetween. The gap 36 may be selected to enable the propagation of an evanescent wave 38 at the overlay portion 27. Because the evanescent wave 38 decays exponentially at a distance from the surface 26, the gap 36 may be very small. In at least one embodiment, the gap 36 may be selected to position the reflective secondary surface 40 within several wavelengths of the light ray 32 from the overlay portion 27 of the surface 26. In at least one embodiment, the surface irregularities between the light pipe 20 and the reflective secondary surface 40 resulting from conventional manufacturing processes may be sufficient to form the appropriate gap 36.

The light source 30 may be coupled to the light pipe 20 such that the plurality of light rays 32 emitted from the light source 30 travel substantially axially through the light pipe 20 in the general direction of the distal end 24. The plurality of light rays 32 may be internally reflected within and along at least a portion of the light pipe 20 and eventually refracted through the surface 26 of the light pipe 20 as a plurality of emitted light rays 34 when the angle of incidence $\theta_i$ is below the critical angle $\theta_c$.

Where a light ray 32 is internally reflected at the overlay portion 27 of the surface 26, the evanescent wave 38 may be generated at the boundary with the reflective secondary surface 40 as shown in FIG. 2. The evanescent wave 38 may then be reflected by the reflective secondary surface 40 across the gap 36 and into the light pipe 20 as an evanescent ray 33. The path of the reflected evanescent ray 33 will generally be different than that of the internal reflected light ray 32 due to refraction at the boundary with the overlay portion 27. Consequently, the angle of incidence of the evanescent ray 33 will generally be different than that of the light ray 32 upon intersecting the emitting portion 28 of the surface 26. As a result, the evanescent ray 33 may be refracted through the emitting portion 28 as an emitted light ray 34 instead of internally reflected as may be the light ray 32. By generating, refracting, and then emitting a plurality of evanescent rays 33 from the surface 26, the light pipe 20 makes use of light energy generally lost at each incidence of total internal reflection of the plurality of light rays 32 along the surface 26, thereby enabling increased efficiency over conventional optical light guides.

In addition to generating, refracting, and then emitting the plurality of evanescent rays 33 from the surface 26, the light pipe 20 further increases efficiency by recapturing and subsequently emitting light rays 34 that are refracted through the overlay portion 27 of the surface 26. Because the reflective secondary surface 40 is reflective, light rays 32 that are refracted through the overlay portion 27 and emitted as emitted rays 34 may be reflected back into the light pipe 20 as reflected rays 35 as shown in FIG. 2. Similar to the evanescent ray 33, the path of the reflected ray 35 will generally be different than that of the internal reflected light ray 32 due to the refraction at the boundary of the overlay portion 27. Consequently, the angle of incidence of the reflected ray 35 will generally be different than that of the light ray 32 upon intersecting the emitting portion 28 of the surface 26. As a result, the reflected ray 35 may be refracted through the emitting portion 28 as an emitted light ray 34 instead of internally reflected, as may be the light ray 32. Alternatively, the reflected ray 35 may undergo additional internal reflection upon intersecting the surface 26, thereby propagating further along the axis of the light pipe 20.

Consequently, the efficiency of the optical light pipe assembly 10 according to the present disclosure is improved over conventional light pipes that do not include the reflective secondary surface 40 adjacent the overlay portion 27 of the surface 26. First, light rays 32 that have an angle of incidence $\theta_1$ upon the surface 26 greater than the critical angle $\theta_c$ may be reflected internally within the light pipe 20 and eventually emitted through the emitting surface 28. Second, light rays 32 that have an angle of incidence $\theta_i$ less than the critical angle $\theta_c$ may be refracted through the surface 26. The light rays 32 refracted at the overlay portion 27 may travel across the gap 36, be reflected by the reflective secondary surface 40 back into the light pipe 20, and eventually emitted through the emitting surface 28 as shown in FIG. 2. Third, light energy that could be lost at a point of total internal reflection may be converted to a propagating evanescent wave 38 that may be reflected by the reflective secondary surface 40 back into the light pipe 20 and eventually emitted through the emitting surface 28, which further contributes to the intensity of the light emitted from the light pipe 20.

The width or area of the reflective secondary surface 40 may be varied to affect the intensity and uniformity of the emitted light distribution and, thereby, the lit appearance along the length of the light pipe 20. In at least one embodiment, the width of the reflective secondary surface 40 may generally increase as the distance from the light source 30 increases to maintain uniform intensity of the emitted light distribution along the length of the light pipe 20. The change in width of the reflective secondary surface 40 need not be linear or constant. Likewise, the width of the reflective secondary surface 40 may decrease as the distance from the light source 30 increases as needed to maintain uniform intensity of the emitted light distribution along the length of the light pipe 20 as described herein. Thus, the positioning, configuration, and properties of the reflective secondary surface 40 relative to the light pipe 20 enable the optical light pipe assembly 10 to produce the desired intensity of light with the desired aesthetic appearance effectively and efficiently. For example, in one exemplary embodiment of a light pipe assembly 10 having a length for 27 inches (in.) (689 millimeters (mm)), the width of the reflective secondary surface 40 may remain relatively narrow and increase very slowly up to a distance approximately 14 in. (356 mm) from the light source 30, where the width of the reflective secondary surface 40 may then increase rapidly over the remaining length of the light pipe 20.

Figures 3A, 3B:
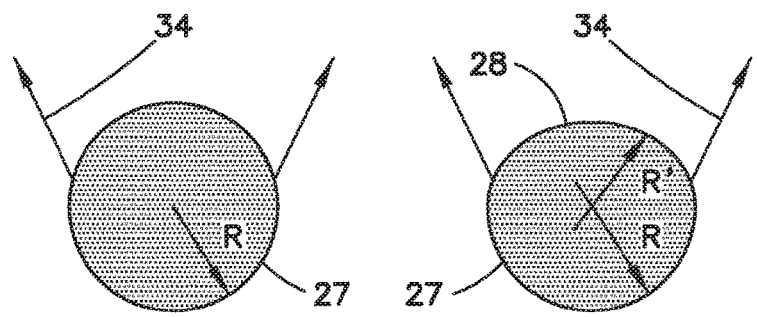
FIG. 3A shows a cross-sectional view of an embodiment of an exemplary optical light pipe assembly according to the present disclosure.
FIG. 3B shows a cross-sectional view of an embodiment of an exemplary optical light pipe assembly according to the present disclosure.

The geometry of the light pipe 20 may be varied according to the desired lit appearance of the light pipe assembly 10. As shown in FIG. 3A, the light pipe 20 may have a circular cross-sectional area of radius R, which may enable the most efficiently reflecting overlay portion 27. The light pipe 20 may have other cross-sectional shapes, including but not limited to elliptical and parabolic. Further, the light pipe 20 may incorporate more than one cross-sectional shape. As shown in FIG. 3B, the light pipe 20 may include a circular reflecting overlay portion 27 of radius R and an elliptical emitting portion 28 of radius R'. The light pipe 20 may have any suitable cross-sectional configuration depending upon the desired lit appearance of the light pipe assembly 10.

FIGS. 4A and 4B show the light pipe assembly 10 according to at least one embodiment of the present disclosure. The light pipe assembly 10 may include more than one light source 30 each disposed at or near both the proximal end 22 and the distal end 24 of the light pipe 20 having the reflective secondary surface 40 disposed adjacent thereto. As shown in FIG. 4A, the reflective secondary surface 40 may varying in width such that the reflective secondary surface 40 is tapered or narrow at or near each light source 30 and wider at a position between the proximal end 22 and the distal end 24. Consequently, the light pipe assembly 10 may incorporate a plurality of light sources 30, and the reflective secondary surface 40 may vary in width accordingly to enable the intensity and uniformity of emitted light rays 34 to form the desired lit appearance of the light pipe assembly 10.

In at least one embodiment according to the present disclosure, the light pipe 20 may not be entirely straight and may include at least one curved portion 29 as shown in FIG. 5. At a curved portion 29, light rays 32 may be more likely to exit the light pipe 20 via the emitting surface 28 due to the changing angles of incidence $\theta_i$ corresponding to the change in geometry and form of the surface 26 of the light pipe 20. Consequently, because light tends to "bleed" or escape the light pipe 20 at or near the curved portion 29, the width of the reflective secondary surface 40 may be decreased at or near the radius of the curved portion 29 to enable and maintain the desired intensity of emitted light.

Figure 6A:
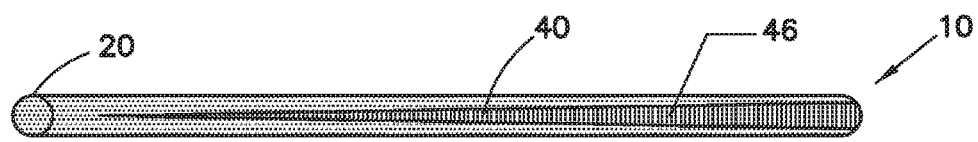
FIG. 6A shows a rear view of an embodiment of an exemplary optical light pipe assembly according to the present disclosure.

In at least one embodiment according to the present disclosure, the light pipe 20 may include a reflective secondary surface 40 formed of and defined by a plurality of spaced bands 46 spanning the width of the reflective secondary surface 40 as shown in FIG. 6A. In at least one embodiment, the spaced bands 46 defining the reflective secondary surface 40 may be closely spaced. The spacing of the spaced bands 46 may be adjusted to affect the intensity and uniformity of the emitted light distribution emitted from the light pipe 20. Consequently, the light pipe assembly 10 may include various configurations of spaced bands 46 to enable the intensity and uniformity of emitted light rays 34 to form the desired lit appearance of the light pipe assembly 10.

Figure 6B:
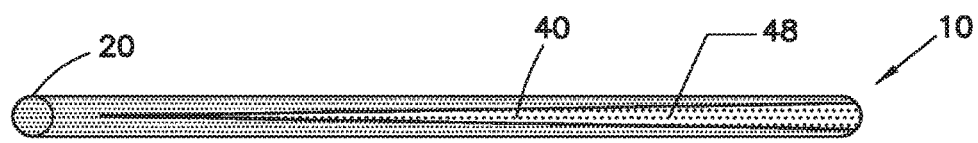
FIG. 6B shows a rear view of an embodiment of an exemplary optical light pipe assembly according to the present disclosure.

In at least one embodiment according to the present disclosure, the light pipe 20 may include a reflective secondary surface 40 formed by a plurality of reflective dots 48 defining the reflective secondary surface 40 as shown in FIG. 6B. In at least one embodiment, the plurality of reflective dots 48 defining the reflective secondary surface 40 may be closely spaced. The spacing or density of the plurality of reflective dots 48 may be adjusted to affect the intensity and uniformity of the emitted light distribution emitted from the light pipe 20. Consequently, the light pipe assembly 10 may include various configurations of the plurality of reflective dots 48 to enable the intensity and uniformity of emitted light rays 34 to form the desired lit appearance of the light pipe assembly 10. In at least one alternative embodiment, the reflective secondary surface 40 may be comprised of other suitable patterns in addition to the spaced bands 46 or reflective dots 48.

Figure 7A:
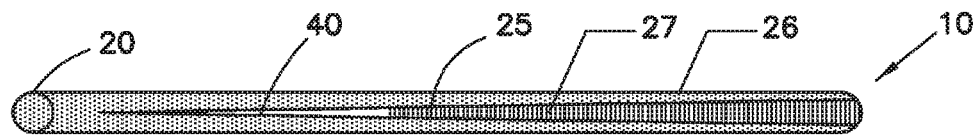
FIG. 7A shows a rear view of an embodiment of an exemplary optical light pipe assembly according to the present disclosure.
Figure 7B:
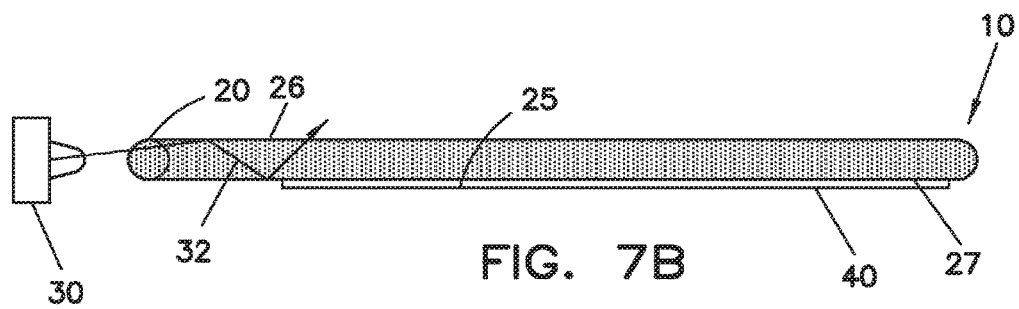
FIG. 7B shows a side view of an embodiment of an exemplary optical light pipe assembly according to the present disclosure.

In at least one embodiment according to the present disclosure, the light pipe 20 may include a plurality of pipe optical elements 25 formed in the overlay portion 27 of the surface 26 as shown in FIGS. 7A and 7B. The pipe optical elements 25 may be formed to further affect the intensity and uniformity of the emitted light distribution from the light pipe 20 by altering the angle of incidence, and thereby refraction, of incident light rays 32. The reflective secondary surface 40 may be disposed adjacent the plurality of pipe optical elements 25 on the surface 26. In at least one embodiment, the plurality of pipe optical elements 25 may be formed such that the plurality of pipe optical elements 25 protrude from the surface 26 as shown in FIG. 7B. However, where the pipe optical elements 25 are relatively large, a significant number of light rays 32 may be emitted near the light source 30. Accordingly, in at least one embodiment as shown in FIG. 7A, the reflective secondary surface 40 may be disposed at or near the proximal end 22 near the light source 30 where no pipe optical elements 25 are formed. In such an embodiment, the reflective secondary surface 40 may not extend over the area including the pipe optical elements 25. In at least one exemplary embodiment, where the pipe optical elements 25 are relatively small, the pipe optical elements 25 combined with the reflective secondary surface 40 may enable a 5-10% increase in the total light emitted.

Figure 8:
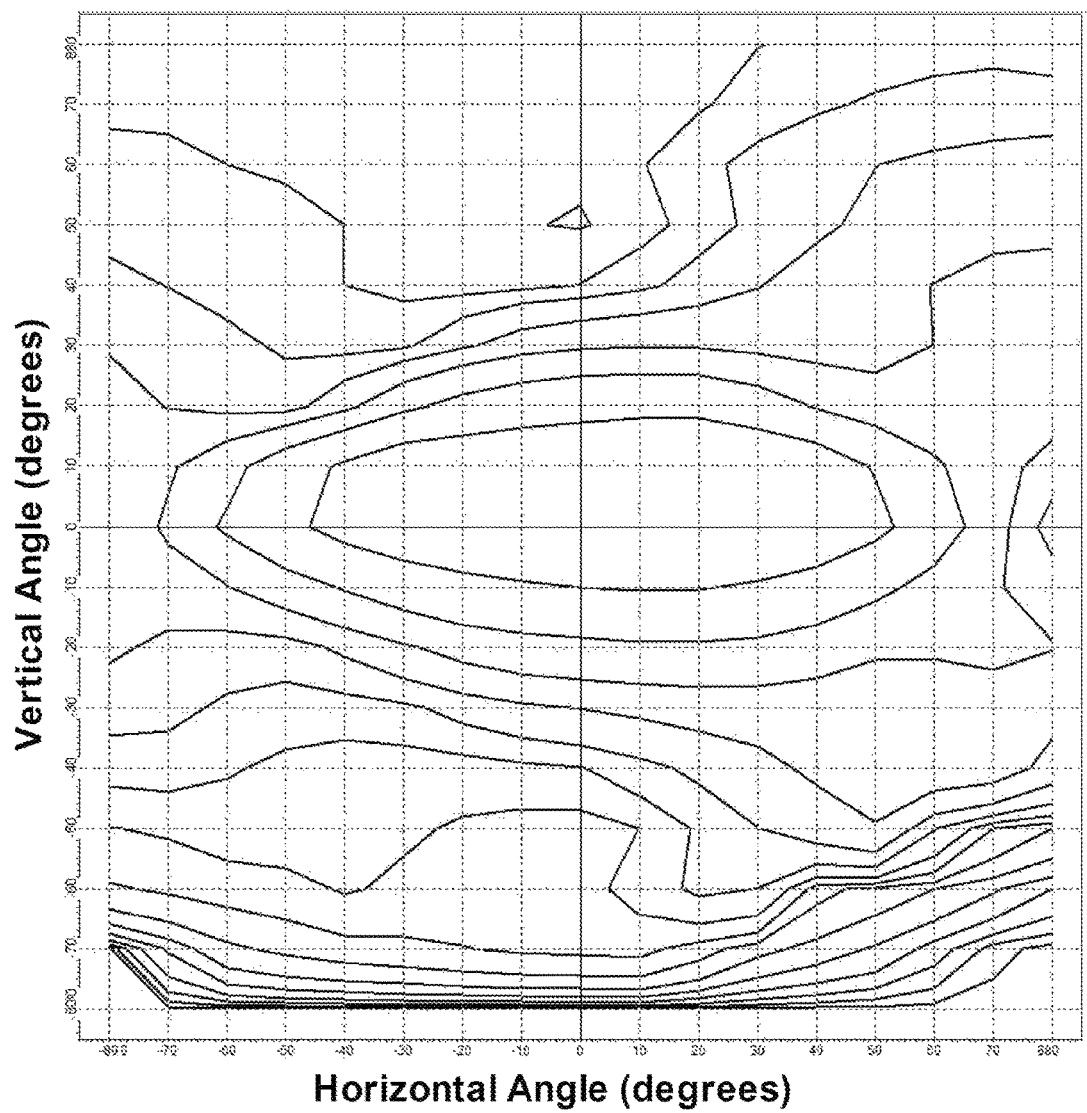
FIG. 8 shows an iso-candela plot of the emitted light distribution of an embodiment of an exemplary optical light pipe assembly according to the present disclosure.

FIG. 8 depicts an iso-candela plot of empirical data of an emitted light distribution of at least one embodiment of the present disclosure. In one exemplary embodiment, the light pipe assembly 10 may include the light pipe 20 having a length of 3 in. (76.2 mm), a circular cross-sectional area having a diameter of 0.375 in. (9.525 mm), and the tapered reflective secondary surface 40 having a maximum width of 0.25 in. (6.35 mm) at or near the distal end 44 and a minimum width of 0.0039 in. (0.10 mm) at or near the proximal end 42. As shown in FIG. 8, such an embodiment may produce an emitted light distribution having an angular spread of about 35 degrees up and down and about 65 degrees left and right.

Figure 9:
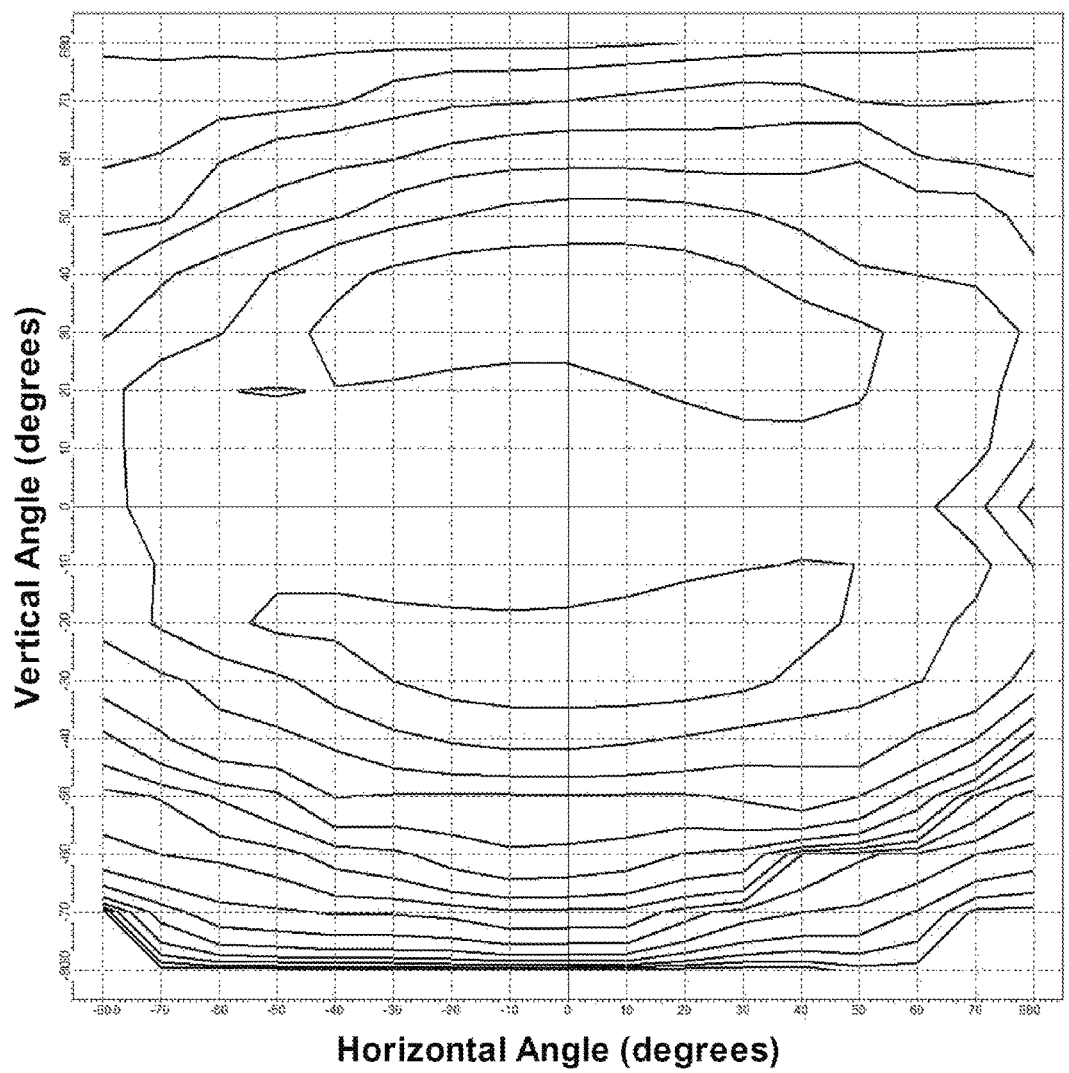
FIG. 9 shows an iso-candela plot of the emitted light distribution of an embodiment of an exemplary optical light pipe assembly according to the present disclosure.

FIG. 9 depicts an iso-candela plot of empirical data from an emitted light distribution of at least one embodiment of the present disclosure. In one exemplary embodiment, the light pipe assembly 10 may include the light pipe 20 having a length of 3 in. (76.2 mm), an elliptical cross-sectional area having a width along its major axis of 0.375 in. (9.525 mm) and a height along its minor axis of 0.25 in. (6.35 mm), and the tapered reflective secondary surface 40 having a maximum width of 0.25 in. (6.35 mm) at or near the distal end 44 and a minimum width of 0.0039 in. (0.10 mm) at or near the proximal end 42. As shown in FIG. 9, such an embodiment may produce an emitted light distribution having an angular spread of about 60 degrees up and down and greater than 80 degrees left and right.

Figure 10:
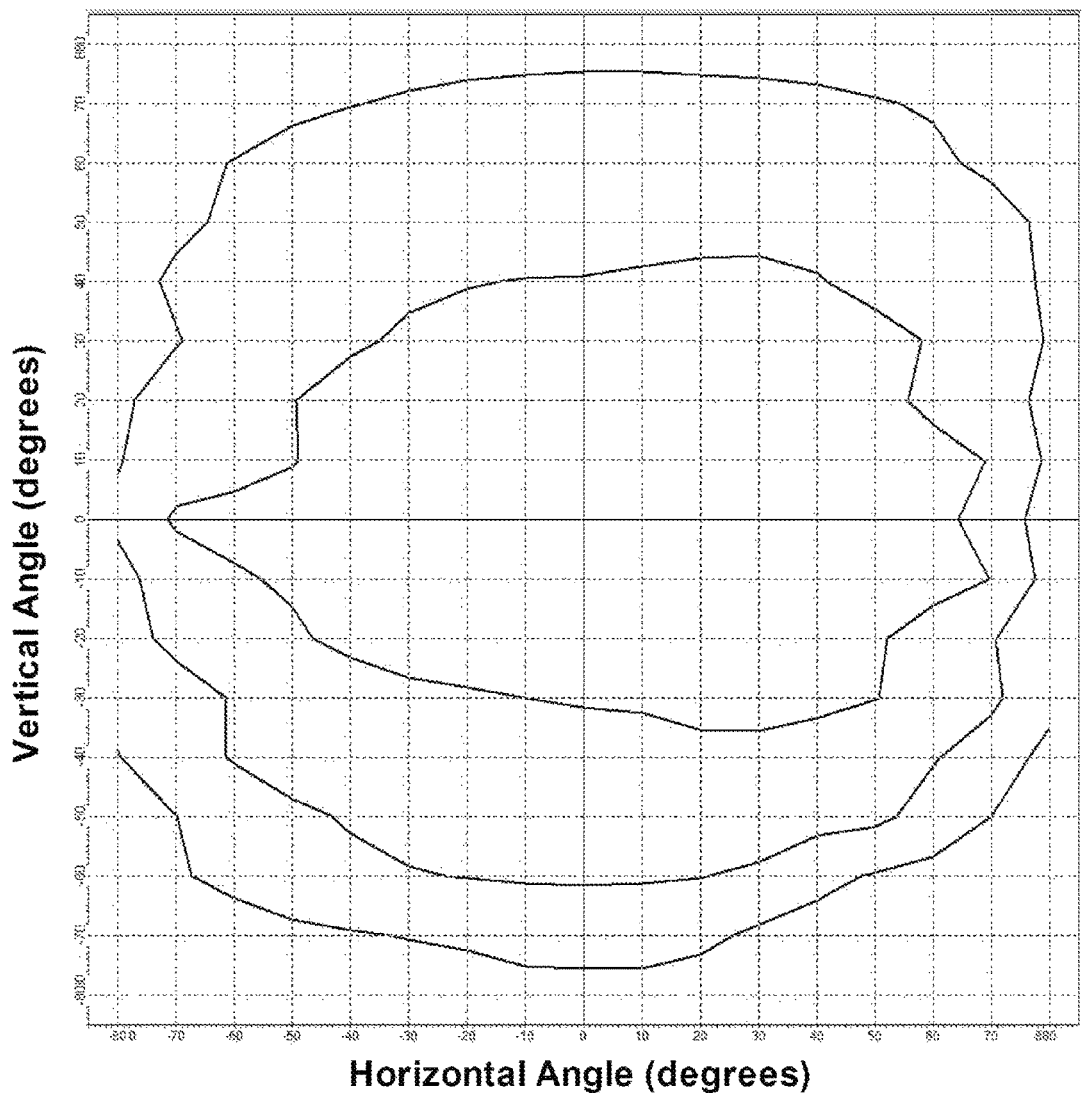
FIG. 10 shows an iso-candela plot of the emitted light distribution of an embodiment of an exemplary optical light pipe assembly according to the present disclosure.

FIG. 10 depicts an iso-candela plot of empirical data from an emitted light distribution of at least one embodiment of the present disclosure. In one exemplary embodiment, the light pipe assembly 10 may include the light pipe 20 having a length of 3 in. (76.2 mm), an elliptical cross-sectional area having a width along its major axis of 0.50 in. (12.7 mm) and a height along its minor axis of 0.125 in. (3.18 mm), and the tapered reflective secondary surface 40 having a maximum width of 0.25 in. (6.35 mm) at or near the distal end 44 and a minimum width of 0.0039 in. (0.10 mm) at or near the proximal end 42. As shown in FIG. 10, such an embodiment may produce an emitted light distribution having an angular spread of greater than 80 degrees up and down and greater than 80 degrees left and right.

The light pipe 20 may be formed of an optical-grade material, meaning the material may have a transmissivity greater than 90% and exhibit very low absorption over the useable, desired, visible wavelengths. For example, the light pipe 20 may be formed of glass, quartz, polymethylmethacrylate (i.e., acrylic), polycarbonate, silicone, or any other suitable optical-grade material. The reflective secondary surface 40 may be formed of any material having a higher refractive index than that of the light pipe 20 and having a sufficient reflectivity to enable the prescribed intensity and uniformity of light emitted by the light pipe 20.

The reflective secondary surface 40 may be formed of a reflective non-metallic material having a refractive index greater than the refractive index of the light pipe 20 to enable evanescent coupling at each point of total internal reflection. Further, the reflective secondary surface 40 may be a dielectric material. Though generally reflective, a metallic material may not be used to form the reflective secondary surface 40. Because the refractive index of a metallic material is a complex number having real and imaginary components, the evanescent field 38 formed at each point of total internal refraction does not enable evanescent coupling of the light rays 32 as described herein. Consequently, if the reflective secondary surface 40 was formed of a metallic material, the light rays 32 would not propagate as a standing wave toward the distal end 24 of the light pipe 20. Instead, the light rays 32 may be reflected off the reflective secondary surface 40 and transmitted through the emitting portion 28 of the surface 26 without traveling a desired distance through the light pipe 20 prior to emission.

The reflective secondary surface 40 may be formed by any suitable process that applies or disposes a dielectric material of higher refraction index than the light pipe 20 adjacent at least the overlay portion 27 of the surface 26. In at least one embodiment according to the present disclosure, the light pipe 20 may include a reflective secondary surface 40 that is formed by a two-shot molding process, where the reflective secondary surface 40 is molded onto the overlay portion 27 of the surface 26 of a previously-molded light pipe 20 as shown in FIGS. 11A and 11B. Moreover, any suitable molding process may be used to form the reflective secondary surface 40 including, but not limited to, transfer molding, insert molding, multicolor molding, laminating, and thermoforming. In at least one embodiment, the reflective secondary surface 40 may be formed by a printing process including, but not limited to tampo-printing, pad printing, screen printing, painting, vapor deposition, hot stamping, or any other suitable process to form the reflective secondary surface 40 described herein.

In at least one embodiment according to the present disclosure, the light pipe assembly 10 may further include a reflective secondary surface 40 formed by a combination of two or more processes. For example, in at least one embodiment as shown in FIG. 12, a first portion 43 of the reflective secondary surface 40 may be formed by a printing process as described herein, and a second portion 45 of the reflective secondary surface 40 may be formed by a molding process as described herein. The use of two or more processes to form the reflective secondary surface 40 may enable the formation of features not otherwise feasibly formed using one process or another.

The light source 30 may be any suitable source of visible light that includes the desired wavelengths of light for a given application. In at least one embodiment of the present disclosure, the light source 30 may be one or more light emitting diodes. In at least one embodiment, the one or more light sources 30 may be either a red, amber, or white light emitting diodes complying with the regulated color requirements of the United States Federal Motor Vehicle Safety Standard 108 or comparable color regulations of other jurisdictions.

The light source 30 may be optically coupled with the light pipe 20 by various means. In at least one embodiment, the proximal end 22 of the light pipe 20 may include a flat profile adjacent the light source 30. In at least one embodiment, the proximal end 22 of the light pipe 20 may include coupling optics engineered to efficiently transfer light rays 32 into the light pipe 20. In at least one exemplary embodiment, coupling optics may increase the transfer efficiency 5-7% compared to a flat profile proximal end 22. In at least one embodiment, the proximal end 22 may be angled to match the numerical aperture of the geometry of the light pipe 20 to further improve transfer efficiency. In at least one exemplary embodiment, a contrast ratio of less than or equal to 1.5 may be obtained using a 27 in. light pipe 20 at 50-55% efficiency, where the light pipe assembly 10 emitted about 30 lumens (lm) using a 56 lm light source 30.

In at least one embodiment according to the present disclosure, the light pipe assembly 10 may further include a lens 50 surrounding at least a portion of the emitting portion 28 of the surface 26 as shown in FIG. 13. The lens 50 may be formed with a plurality of lens optical elements 52 formed in and across at least a portion of a surface 54 of the lens 50. In at least one embodiment, the lens 50 may include any type of lens optical elements 52 including, but not limited to, Fresnel, flute, pillow, reflex, or any other suitable optic configuration. The lens 50 with the plurality of lens optic elements 52 may be formed to enable the desired functional light distribution and the intensity and uniformity of the emitted light distribution emitted from the light pipe 20 to further enable the desired lit appearance of the light pipe assembly 10.

The optical light pipe assembly 10 may be implemented in various applications to enable a uniform lit appearance. By way of non-limiting example, in at least one embodiment, the light pipe assembly 10 may be used in an automotive lamp having a lens and a housing to provide a vehicle's tail lamp function and a desired appearance, which may integrated into the styling theme of the vehicle. Likewise, the light pipe assembly 10 may be used in an automotive applique lamp and integrated into the styling theme of the vehicle. In one exemplary embodiment, the light pipe assembly 10 may be particularly suited for a park function automotive lamp. In one exemplary embodiment, the light pipe assembly 10 may be implemented in a center high-mounted stop lamp. Where light pipe assembly 10 is used within the housing and the lens in a lamp assembly, the lens may include lens optical elements, similar to the plurality of lens optical elements 52, including, but not limited to, Fresnel, flute, pillow, reflex, or any other suitable optic configuration.

While various embodiments of optical light pipe and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A light pipe assembly, comprising:
   a light pipe extending from a proximal end to an opposing distal end and defining a surface comprising an emitting portion and an overlay portion, the light pipe comprising a material capable of transmitting light with a first refractive index; and
   a reflective secondary surface comprising a second refractive index greater than the first refractive index, the reflective secondary surface disposed adjacent the overlay portion of the light pipe, the width of the reflective secondary surface, as measured in a circumferential direction radial to the light pipe, varies along a length of the light pipe.

2. The light pipe assembly of claim 1, wherein the reflective secondary surface comprises a non-metallic material capable of reflecting light.

3. The light pipe assembly of claim 1, wherein the reflective secondary surface is disposed adjacent the overlay portion such that a gap is formed between the reflective secondary surface and the light pipe, the gap selected such that the reflective secondary surface can propagate an evanescent wave at a point where any of a plurality of light rays traveling through the light pipe are internally reflected at a boundary between the overlay portion and reflective secondary surface.

4. The light pipe assembly of claim 3, wherein the gap is variable along a length of the light pipe.

5. The light pipe assembly of claim 1, wherein the light pipe comprises a bend, and wherein the reflective secondary surface is narrower at or near the bend than at a location adjacent thereto.

6. The light pipe assembly of claim 1, further comprising:
   at least one first light source disposed adjacent the proximal end of the light pipe and capable of generating a plurality of light rays generally directed into the light pipe in a direction of the distal end.

7. The light pipe assembly of claim 6, further comprising:
   at least one second light source disposed adjacent the distal end of the light pipe and capable of generating a plurality of light rays generally directed into the light pipe in a direction of the proximal end.

8. The light pipe assembly of claim 7, wherein at least one of the at least one first light source and the at least one second light source is a light emitting diode.

9. The light pipe assembly of claim 1, wherein the overlay portion of the light pipe comprises a cross-sectional area having a first shape and the emitting portion of the light pipe comprises a cross-sectional area having a different, second shape.

10. A lamp assembly, the lamp assembly comprising:
    a light pipe assembly, comprising:
       a light pipe extending from a proximal end to an opposing distal end and defining a surface comprising an emitting portion and an overlay portion, the light pipe comprising a material capable of transmitting light with a first refractive index; and
       a reflective secondary surface comprising a second refractive index greater than the first refractive index, the reflective secondary surface disposed adjacent the overlay portion of the light pipe, the width of the reflective secondary surface, as measured in a circumferential direction radial to the light pipe, varies along a length of the light pipe;

at least one light source disposed adjacent the proximal end of the light pipe and capable of generating a plurality of light rays generally directed into the light pipe in a direction of the distal end;

a housing; and a lens disposed adjacent the housing such that the lens and housing substantially surround the at least one light source, the light pipe, and the reflective secondary surface.

11. The lamp assembly of claim 10, wherein the reflective secondary surface comprises a non-metallic material capable of reflecting light.

12. The lamp assembly of claim 10, wherein the reflective secondary surface is disposed adjacent the overlay portion such that a gap is formed between the reflective secondary surface and the light pipe, the gap selected such that the reflective secondary surface can propagate an evanescent wave at a point where any of a plurality of light rays traveling through the light pipe are internally reflected at a boundary between the overlay portion and reflective secondary surface.

13. The lamp assembly of claim 12, wherein the gap is variable along a length of the light pipe.

14. The lamp assembly of claim 10, wherein a width of the reflective secondary surface is wider at or near the distal end than at or near the proximal end of the light pipe.

15. The lamp assembly of claim 10, wherein the overlay portion of the light pipe comprises a cross-sectional area having a first shape and the emitting portion of the light pipe comprises a cross-sectional area having a different, second shape.

16. The lamp assembly of claim 10, further comprising at least one additional light source disposed adjacent the distal end of the light pipe and capable of generating a plurality of light rays generally directed into the light pipe in a direction of the proximal end.

17. The lamp assembly of claim 10, wherein the at least one light source is a light emitting diode.

18. A light pipe assembly, comprising:

a light pipe extending from a proximal end to an opposing distal end and defining a surface comprising an emitting portion and an overlay portion, the light pipe comprising a material capable of transmitting light with a first refractive index; and a reflective secondary surface comprising a second refractive index greater than the first refractive index, the reflective secondary surface disposed adjacent the overlay portion of the light pipe, the width of the reflective secondary surface, as measured in a circumferential direction radial to the light pipe, varies along a length of the light pipe; and at least one first light source disposed adjacent at least one end of the proximal end and the distal end of the light pipe and capable of generating a plurality of light rays generally directed into the light pipe from the at least one end;

wherein the reflective secondary surface comprises a material selected from the group consisting of a non-metallic material capable of reflecting light and a dielectric material capable of reflecting light.

19. The light pipe assembly of claim 18, wherein the reflective secondary surface is disposed adjacent the overlay portion such that a gap is formed between the reflective secondary surface and the light pipe, the gap selected such that the reflective secondary surface can propagate an evanescent wave at a point where any of a plurality of light rays traveling through the light pipe are internally reflected at a boundary between the overlay portion and reflective secondary surface.

\* \* \* \* \*